June 6, 1961
K. J. GOERING
2,987,399
PROCESS OF OBTAINING THE PROTEINACEOUS FEED
MATERIAL FROM MUSTARD SEED, RAPE
SEED AND SIMILAR SEEDS
Filed Jan. 23, 1959
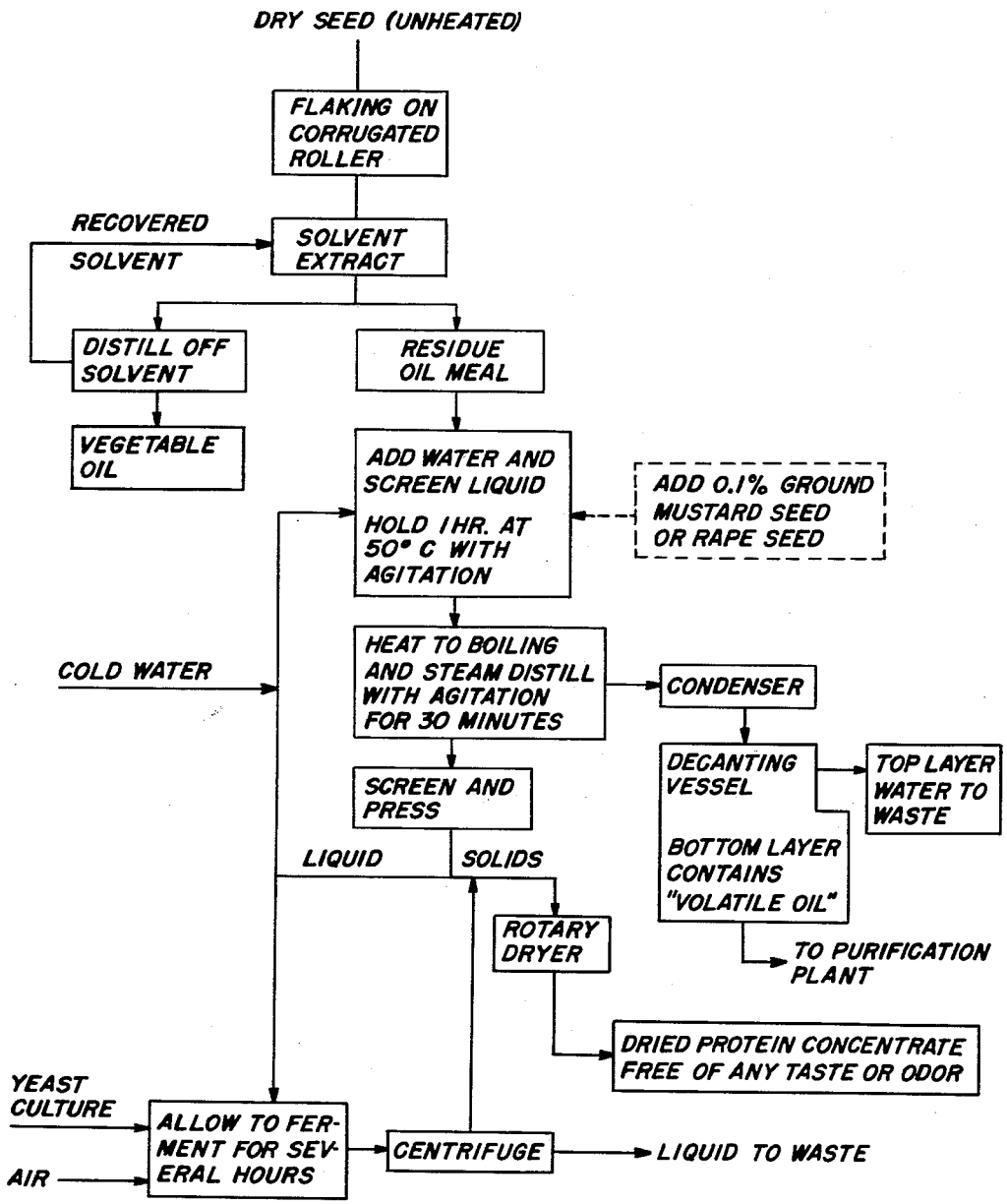
Kenneth J. Goering
INVENTOR.
BY
Attorneys 2,987,399
PROCESS OF OBTAINING THE PROTEINACEOUS FEED MATERIAL FROM MUSTARD SEED, RAPE SEED AND SIMILAR SEEDS
Kenneth J. Goering, Bozeman, Mont., assignor to Oil Seed Products, Inc., Great Falls, Mont., a corporation of Montana
Filed Jan. 23, 1959, Ser. No. 788,676
12 Claims. (Cl. 99—2)

This is a continuation-in-part of my earlier application Ser. No. 741,149, filed June 10, 1958, now abandoned.

This invention relates to the processing of proteinaceous seeds which at the present time do not yield a proteinaceous material which is usable for feeding purposes, partly on account of unpalatable taste and odor and partly because they contain either toxic substances or substances which are converted into toxic substances in the digestive tract of animals fed with the said proteinaceous material.

The seeds which may be converted into feeding material and which may be used either alone or in combination with other feed material belong to the genus Brassica and more specially to the group consisting of mustard seed, rape seed, and seeds of related species.

Seeds of this type are regularly processed to obtain a vegetable oil which is used in oriental countries such as India, Siam, or Indonesia, as a substitute for soy bean oil. Such processes furnish a by-product, an oil meal cake, which on account of its unpalatable taste and odor is either not usable or has only very limited uses.

Only small quantities of the proteinaceous oil meal cake of some of these seeds, for instance, of rape seed, may be added to a feed without making the feed unpalatable or even toxic. The processing of rape seed is normally carried out to obtain a vegetable oil either for the purpose above mentioned or to obtain a lubricant, as rape seed oil has a high viscosity and may be used as a lubricant or as part of a lubricant, as it mixes very well with mineral oils and as is emulsifies with salt water. This use, originally much more extensive, is now limited to lubrication and especially to marine lubricants. Because the oils extracted from the seeds which have been above mentioned, such as mustard seed, rape seed, etc., contain a high percentage of high molecular weight oils which, when hydrogenated, may form the nuclei for liquid shortening, their use as a shortening is also contemplated.

Now all the processes for extracting oil from the seeds above mentioned, such as mustard seed, rape seed, etc., produce meal cakes containing proteinaceous material which, as above stated, is only of limited use, and it is a main object of the invention to provide a process by means of which the unpalatable taste and odor of these meal cakes is removed and by means of which a proteinaceous feed material is produced which, either alone or in combination with other feed materials, produces an excellent animal feed. Further, some of the oil residue meals contain and permit the recovery or extraction of substances which are highly valuable in themselves. This is especially the case in connection with mustard seed. The substance which makes the mustard seed unpalatable consists in allyl isothiocyanate, a volatile oil, which is usually synthetically produced. This substance has a number of industrial, pharmaceutical and agricultural uses. For instance, it is used in the manufacture of adhesives for laminating rubber to rayon, see, for instance, U.S. Patent No. 2,564,640 of August 14, 1951; it has pharmaceutical uses as a counter-irritant in the case of neuralgia, pleurisy, and rheumatism; and it is also used in agriculture to control the potato root eel worm. Thus, it is in itself a valuable product since the extraction from mustard seed produces an economical gain, as the costs of the synthetic production considerably exceed the costs of extraction from mustard seed according to the invention.

Also those seeds from which such valuable products may not be obtained in quantity, such as rape seed, produce, by applying the process according to the invention, a proteinaceous substance usable as an animal feed either alone or in combination with a feed which is deficient in certain amino acids in which the proteinaceous substance derived from the above named seed is rich, so that the latter forms a suitable supplement which is cheap while such supplements are usually only procurable at high cost.

The process according to the invention is based on the fact that the seeds above mentioned, such as mustard seed, rape seed, etc. contain thioglucosides—for instance, sinigrin—the presence of which is usually responsible for the unpalatable taste and in some instances for the toxic properties. Applicant has found that the thioglucoside sinigrin may be hydrolyzed by the enzyme myrosin (Myrosinase, Sinigrinase) which is contained in the seeds themselves and the products of this hydrolysis are, in the case of mustard seed, for instance, glucose, potassium, acid sulfate, and allyl-isothiocyanate, the latter being in the first place responsible for the unpalatable taste. This last-named product is a volatile oil, highly valuable as above explained, which may be removed by distillation.

However, according to the invention, whether the residual oil meal cake contains some specially valuable volatile oil or not, essentially the same process leading to the disintegration of the sinigrin is carried out. For instance, seeds such as rape seeds do not yield enough highly valuable volatile oil upon the decomposition of sinigrin to make its recovery worth while. To obtain the desired result, it is however, essential that the sinigrin or other thioglucosides present be decomposed by hydrolysis and this is accomplished by using the enzyme contained in the seeds themselves. The reason for the necessity of this decomposition during the process is the fact that the thioglucosides, such as sinigrin, seems to be decomposed in the digestive system of animals to glucose and sulfuric organic compounds, the latter being toxic to the animal. Published work on this subject indicates that it is not possible to add more than 10% of rape seed meal to food without producing decidedly toxic effects.

To produce decomposition of the thioglucoside sinigrin, it is necessary to minimize the destruction of the enzyme myrosin during the oil extraction process producing the vegetable oil in order to make the enzyme available for the destruction of the sinigrin by hydrolysis, and this is obtained in the first place by eliminating the usual heat treatment prior to the extraction of the vegetable oil. Moreover subsequent to any oil extraction step, optimum conditions for the complete destruction of the sinigrin must be produced. After decomposition of the sinigrin by hydrolysis, the sulphur containing compounds may be easily removed by steam stripping.

In some modifications of the process, additional treatment steps may be added in order to increase the amount of the enzyme by adding a small quantity of ground raw mustard seeds or rape seeds to the residue remaining after the extraction of the vegetable oil from the seeds treated.

This last-named step seems to be very effective in producing the desired result.

The process according to this invention is illustrated in the accompanying flow diagram which shows several different possible modifications of the process by way of example. It is to be understood that the examples indicated in the diagram do not represent a survey of all possible modifications and that, therefore, further modifications may be introduced without in any way departing from the essence or principle of the invention.

The optional addition of mustard or rape seed is indicated in the flow diagram by dotted lines. Otherwise, the modifications are indicated by the inscriptions.

According to the process illustrated in the flow sheet, the dry seed is first flaked, but is not heated either before or during this step. The flaking may be carried out by means of corrugated rollers. The flaked seed is then subjected to a conventional extraction process carried out by means of a solvent for removing the vegetable oil therefrom. The treatment may be carried out by means of any solvent conventionally used for this purpose, the solvent used in a specific example being, for instance, hexane. For the purpose of economy, the solvent may be distilled off for re-use and may be re-introduced into the cycle in a subsequent extraction step. The vegetable oil thus obtained which is similar to soy bean oil may then be used as a substitute for the soy bean oil. What remains after extraction by means of the solvent is a residue oil meal. This meal which may be, for instance, mustard oil residue meal or rape seed oil residue meal, contains proteinaceous substances. In order to prepare from this meal a concentrate usable as a feed substance, the residue oil meal is placed into a jacketed vessel and is mixed with tap water, preferably warmed to about 50° C.

Parts of the fresh water which must be warmed may be replaced by the screen liquid from the screen which is described below and which has a higher temperature. The residue oil meal and water is gently agitated in a closed system, such as the jacketed vessel, connected with a condenser. The pH of the mixture will be between 5.1 and 5.5, which is an optimum pH for the action of the myrosin on the sinigrin.

After the above temperature has been maintained for about one hour, the temperature is raised as rapidly as possible to the boiling point by heating the jacket of the vessel in which the meal and water is kept. As soon as the boiling point is reached, live steam is injected into the bottom of the vessel and agitation is continued, the steam distillation being continued for about thirty minutes. The mixture is then screened and pressed to recover the solids which are subsequently dried in an oven. The screen liquid may be re-used by mixing it with a sufficient volume of cold tap water as mentioned above, which is then added to another batch of the cake. The addition of cold tap water cools the screen liquid sufficiently so that when the cold tap water is added, the temperature of the mixture of tap water and screen liquid is between 45° and 50° C., the volume of screen liquid and tap water being selected accordingly so that the optimum temperature for the hydrolysis by means of the enzyme is obtained.

It was observed that after the screen liquid was used several times, the specific gravity of the filtrate remained constant. This indicates that solids adhering to the screened portion equal those dissolved from the fresh cake.

EXAMPLE 1

1000 g. of dry mustard seed which is unheated is flaked by means of corrugated rollers and is treated with a solvent such as hexane. For each 100 g. of residue, 600 ml. of water (either tap water or a mixture of screen liquid and tap water) warmed to a temperature of 50° C. is used and is agitated for one hour. As above stated, due to the buffering action of mustard seed, this will produce a pH of 5.1 to 5.5.

The temperature is then rapidly raised to 100° C. and live steam is injected into the vessel containing the mixture for about 30 minutes.

The condensate from the steam distillation is collected in a receiving vessel where it is separated into layers. The volatile oil, which is in this case allyl isothiocyanate (specific gravity 1.020), settles on the bottom of the receiving vessel, while the top layer is formed by water which may be discharged and go to waste. The volatile oil can be separated from the water by drawing it off from the bottom. The allyl isothiocyanate may then be further purified by extraction with ether, separating the ether layer from the water layer and evaporating the ether from the allyl isothiocyanate. From 1000 g. of mustard seed 5 g. of allyl isothiocyanate may be recovered. The recovery of the allyl isothiocyanate is in itself sufficient to economically justify the above described process as it is valuable enough to more than pay for the process of purification of the mustard seed protein.

The remaining material is screened and pressed and passed through a rotary drier. This yields 380 g. of a dried protein concentrate which is free of any taste or odor and non-toxic. If the liquid fraction is concentrated and dried and added to the solids, the total recovery is 570 g.

In making many extractions in the above described manner where the screen liquor from one batch is used in treating a fresh batch, it has been observed that the screen liquid becomes thick and slimey after several extractions and although it does not contain any appreciable amount of starch, it actually contains a considerable quantity of fermentable sugars and some soluble protein. Therefore, after the screen liquid has been used several times it may be dumped into a tank and inoculated with yeast. After aerating for a few hours, the yeast multiplies utilizing the available sugar and protein. The solution is either centrifuged to remove the yeast or it is evaporated down to a small volume and the yeast is added back to the meal cake. The additional vitamins and other growth factors in the yeast protein enhance the feeding value of the meal.

In the above specific example, it will be noted that the extracted meal and water initially used are mixed in the ratio of approximately 1 to 6. Although this ratio of meal to water can be varied over wide limits for the purpose of economy, a minimum amount of water should be used, as an excess must be evaporated to recover the more valuable products. Therefore, it is preferred that the ratio of meal to water be substantially in the range between about 1 to 6 to about 1 to 8, the higher ratio of water requiring less additional water in recycling the screen liquor.

The temperature of the initial water added to the extract residue oil cake must not be greater than 55° C. and it is also necessary that the screen liquid when recycled must not be at a temperature exceeding 55° C. when added to a fresh batch of meal. On the other hand, a temperature substantially lower than 55° C. would slow down the conversion of the sinigrin and for this reason the preferred temperature range for water or for screen liquid added should be within the range of about 45 to about 55° C.

EXAMPLE 2

The process is the same as in Example 1, with the exception that to the residue mustard oil meal not only water but also 0.1% of ground mustard seed is added in order to increase the enzyme which is active in hydrolyzing the sinigrin.

A number of trial runs with mustard seed according to Example 1 give the following typical result:

| Trial No. | Wt. mustard seed, g. | Vol. Fr. water added (ml.) | Vol. (ml.) screening liquor[1] | Sp. G. liquor | pH screening liquor | Wt. (gr.) dry protein cake |
|---|---|---|---|---|---|---|
| 1 | 100 | 600 | 300 | 1.025 | 5.20 | 76.5 |
| 2 | 100 | 300 | 300 | 1.027 | 5.25 | 85.5 |
| 3 | 100 | 300 | 275 | 1.030 | 5.20 | 99.0 |
| 4 | 100 | 325 | 275 | 1.032 | 5.15 | 94.0 |
| 5 | 100 | 325 | 300 | 1.032 | 5.20 | 96.0 |
| 6 | 100 | 300 | 300 | 1.032 | 5.20 | 95.0 |

[1] On pressing with Davenport or similar press, one would recover nearly 100 ml. additional water which would mean that it would take about 100 ml. less fresh water. Slight cooling might be required under these conditions.

From the above table it is observed that the acidity of the filtrate does not appear to increase as the liquid is used over and over. Furthermore, once the solid concentration reaches a specific gravity of around 1.03, the recovery of protein is nearly constant. There does not appear to be any reason why this type of treatment could not be continued indefinitely, thus allowing overall recovery of 90–98% of the total protein.

The dry cake was odorless and tasted somewhat like dried milk. It was very stable, as when made moist and allowed to stand for several days it failed to give off any odor or volatile mustard oil.

EXAMPLE 3

7000 g. of rape seed are treated with a solvent which may be hexane. The extraction results in 4,500 g. of rape seed oil meal cake. The rape seed has not been preheated and it is mixed with 27 l. of tap water, the mixture being warmed to 50° C. This mixture is held in a jacketed vessel. An additional amount of 45 g. of ground unextracted mustard seed is added and the entire mixture is held within the vessel at 50° C. for one hour with gentle agitation. The mixture is then heated up to the boiling temperature (100° C.) over a period of one hour and boiled in the steam jacketed vessel for 15 minutes. The vessel is connected with a condenser and the sulphur containing compounds are steam stripped by introducing steam into the vessel but may be recovered in the condenser. After the period above mentioned, it is found that all sulphur containing compounds are removed.

The solids may then be recovered by screening and drying the screened product. The screen liquor is evaporated until it forms a heavy syrup and is added back to the dried solids. The resulting mixture is dried to 10% moisture and then may be directly used in the feeding tests.

The recovery of this process is 4,320 g. or 95% of the weight of the starting material. As in laboratory tests, small amounts are lost in the handling operation, the recovery may even reach a higher percentage if the process is carried out carefully on an industrial scale.

In order to save steam necessary for heating the tap water, the screen liquor may also be used to heat fresh batches in the manner described in Example No. 1.

EXAMPLE 4

Example 4 is the same as Example 3 in all steps except that 45 g. of unextracted rape seed is used instead of mustard seed.

Feeding experiments were conducted with rats with mustard seed meal (MSM) as well as with rape seed meal (RSM). In a specific experiment conducted with mustard seed meal, prepared according to Example 2, that is, with an addition of 0.1% of ground mustard seed meal to the solvent extracted residue, the MSM was fed as the sole protein source to the rats for six weeks. For control purposes, the same number of rats was fed with soy bean meal (SBOM) as a sole protein source. The tests were run with two pens with 4 rats in each pen.

Table I

| Total proteins | | Total Gain | Feed/100 g. gain (average) |
|---|---|---|---|
| 100% SBOM (control) | males | 816 | lost due to spillage. |
| | females | 494 | |
| 100% MSM | males | 432 | 342. |
| | females | 326 | |

The females were taken through pregnancy which resulted in a total of 22 healthy rats from four mothers or rats exclusively fed on mustard seed meal. The control rats fed on soy bean oil meal resulted in only 14 rats.

With rape seed meal, a series of feeding experiments were conducted which are tabulated below.

Rape seed meal (RSM) was the sole source of protein while starch was used as the carbohydrate. This was supplemented with the usual vitamin mixture ration. The tests reported were run with two pens each containing four rats from each group. The tests were run for two weeks.

Table II

| Treatment | | Total gain | Feed per 100 g. gain |
|---|---|---|---|
| (1) Solvent extracted rape seed oil meal with no additional treatment. | Males | 131 | The rats lost weight. 5 died after 8 days and 1 more the next day. The other 2 killed for autopsy.[1] |
| | Females | 121 | |
| (2) Solvent extracted rape seed oil meal plus 0.1% ground mustard seed, Ex. 3. | Males | 70 | 411. |
| | Females | 54 | 533 (no unhealthy rats). |
| (3) Solvent extracted rape seed oil meal plus 0.1% ground rape seed, Ex. 4. | Males | 22 | 1,000.[2] |
| | Females | 11 | 1,055.[2] |

[1] Autopsy showed involution of the thymus gland. Its size was only one-third that of a normal rat.
[2] Rats appear a little rough compared to those receiving treatment No. 2.

The following feeding experiment was carried out with rats fed with rape seed meal (RSM) processed with 0.1% of ground mustard seed in combination with soy bean meal (SBOM) at various levels. These tests ran seven weeks with four rats per pen and 2 pens per treatment.

Table III

| Treatment, Protein source | | Total gain | (Average for both sexes) Feed/100 g. gain |
|---|---|---|---|
| 100% SBOM | Males | 705 | 407 |
| | Females | 406 | |
| 12½% RSM, 87½% SBOM | Males | 666 | 411 |
| | Females | 357 | |
| 25% RSM, 75% SBOM | Males | 562 | 404 |
| | Females | 318 | |
| 50% RSM, 50% SBOM | Males | 437 | 436 |
| | Females | 230 | |
| 100% RSM | Males | 224 | 610 |
| | Females | 133 | |

This meal was from a different lot of rape seed than that used in Table I. No unhealthy rats were observed in this experiment. Autopsy on rats which were on the 100% rape seed meal failed to reveal anything unusual.

From the above data, it is observed that although the feed efficiency of rape seed meal is equal to that of soy bean meal, in rations containing up to nearly 50% treated rape seed meal, the growth is somewhat less. This fact along with the reduced efficiency on 100% rape seed meal seems to be due to a deficiency in certain amino acids which may be present in inadequate amounts in rape seed meal but which are present in adequate amounts in the cereals which would be fed along with these proteins. Exactly the same situation which has been above stated applies also to the mustard meal as shown by the tables.

In order to be able to evaluate the reasons for the lower rate of growth in feed efficiency of mustard meal or rape seed meal, an amino acid assay was run, using the Moore & Stein technique. The results are reported in the following table in terms of percent of the total amino acid nitrogen which is present.

Table IV

|  | Barley "Compana" | Barley "Vantage" | Soybean | Mustard |
|---|---|---|---|---|
| Aspartic | 1.7 | 2.9 | 8.8 | 9.7 |
| Serine | 2.0 | 3.6 | -------- | 4.5 |
| Threonine [1] | 1.6 | 2.5 | 4.0 | 4.2 |
| Glutamic | 36.5 | 37.3 | 21.0 | 22.8 |
| Proline | 18.9 | 9.5 | -------- | 15.6 |
| Glycine | 1.5 | 2.4 | -------- | 3.9 |
| Alanine | 2.1 | 4.0 | -------- | 6.1 |
| Valine [1] | 6.3 | 6.3 | 4.2 | 2.2 |
| Tyrosine | 3.2 | 2.9 | 4.1 | 1.8 |
| Phenylalanine [1] | 5.1 | 5.3 | 5.7 | 3.3 |
| Histidine [1] | 2.1 | 1.4 | 2.3 | 1.9 |
| Lysine [1] | 3.5 | 2.6 | 5.4 | 5.8 |
| Arginine [1] | 3.6 | 3.0 | 5.8 | 2.1 |
| Methionine [1] | 1.1 | 0.5 | 2.0 | 5.7 |
| Leucine [1] | 9.1 | 6.8 | 6.6 | 3.5 |
| Isoleucine [1] | 3.4 | 3.4 | 4.7 | 2.9 |

[1] Essential for growth in rats.

The table also contains data on barley protein and on soy bean protein. From this data it appears that the low values for mustard protein are to be found especially in the limited amounts of valine and leucine. These two amino acids are, however, present in adequate amounts in the common cereals, as seen from the table.

The following feeding Table V confirms the assumption; it was run with barley replacing the starch in the ration. The protein present in the barley replaces some of the mustard seed protein.

Table V

Rats fed with mustard seed meal (treated according to Ex. No. 2) and barley as sole protein and carbohydrate sources with usual vitamin mixture. Tests for two weeks with four rats per pen and 2 pens.

|  | Total gain | Feed/100 g. gain |
|---|---|---|
| Males | 169 | 289 |
| Females | 157 | 285 |

Although the growth was a little slower than on soybean meal as sole protein source, the feed efficiency was about 25% better. This might be expected since mustard seed meal contains about three times the methionine and 10% more lysine than does soybean meal. These two amino acids are known to be limiting factors in animal nutrition. Barley supplied adequate amounts of valine and leucine, two amino acids known to be present in inadequate amounts in mustard and rape seed meals. From the above data it appears that a combination of barley protein and mustard meal is an excellent combination giving high feed efficiency. Rape seed oil meal processed according to Examples 3 and 4 gives corresponding results.

From the above, it will be seen that the process according to the invention produces a protein which may be fed alone, but preferably is fed together with a cereal supplementing the deficiency in some amino acids of the mustard seed meal or rape seed meal treated according to the invention while at the same time the products obtained according to the invention supplement the deficiency of the cereals in certain other amino acids. It is thus clear that the best results will be obtained by mixing the protein obtained from mustard seed or rape seed with certain cereals such as indicated, especially barley. However, as the tests indicate, the deficiency is not serious enough to prevent the protein obtained with the process according to the invention to be used alone.

It will be clear that the process described may be subjected to certain changes without in any way departing from the essence of the invention as defined in the annexed claims.

What is claimed as new is as follows:

1. The process of treating the oil extraction residue meal of mustard seed, from which a vegetable oil has been extracted by means of a solvent, comprising controlling the temperature of the seeds and keeping it from being raised during the extraction process, to prevent decomposition of the enzyme myrosin naturally occurring in the seeds, mixing the mustard oil residue meal with water in an amount sufficient to produce a ratio of water to oil extraction meal in the resulting mixture of between 8:1 and 6:1 parts by weight, bringing the mixture to a temperature ranging between 45°–55° C., maintaining the mixture at said temperature for a time sufficient to produce hydrolysis of the sinigrin naturally occurring within the seeds, heating the mixture thereafter to the boiling point and admitting live steam to the mixture to produce distillation of allyl isothiocyanate being one of the products of the hydrolysis, separating the allyl isothiocyanate from water and purifying the same and screening, pressing and drying the remainder of the mixture which has not been distilled off, thus recovering simultaneously allyl isothiocyanate and a proteinaceous concentrate.

2. The process of treating mustard oil extraction residue meal as claimed in claim 1 wherein the mixture of water and residue meal is held under agitation for a period of one hour and the steam distillation is maintained for a period of thirty minutes.

3. The process of treating mustard seed oil extraction residue meal as claimed in claim 1 wherein a small amount of raw mustard seed is added to the mixture of residue meal and water.

4. The process of treating mustard seed oil extraction residue meal as claimed in claim 1 wherein a small amount of raw rape seed is added to the mixture of residue meal and water.

5. The process of claim 6 wherein the seed treated is rape seed and wherein for each 4500 g. of rape seed meal, 27 l. of water are added and the mixture is warmed to a temperature of 50° C. and held at this temperature for one hour, the mixture being then heated to the boiling point during a period of approximately one hour and boiled for 15 minutes, the volatile sulfur containing compounds being removed during such boiling to a condenser, all volatile sulfur containing compounds being removed after the above period, screening, pressing and drying the solids, removing the liquid during screening, evaporating the liquid removed during screening so as to form a heavy syrup, adding the same to the dried solids and drying the mixture of syrup and dried solids to 10% moisture content.

6. A process of treating seeds selected from the group consisting of mustard seed and rape seed which comprises: separating the vegetable oil from the seed while avoiding subjecting the seed to a temperature sufficient to destroy the enzymatic activity of any substantial portion of the myrosin present therein; recovering as separate products the vegetable oil in said seed and an oil-free meal; forming a mixture of said oil-free meal in water wherein the ratio of meal to water lies between 1:6 and 1:8 by weight; maintaining the mixture within the temperature range of between about 40° C. and 55° C. for a time sufficient to substantially complete the hydrolysis of thioglucosides in said meal by means of the enzyme in said meal and to thereby liberate allyl isothiocyanate as a product of said hydrolysis; and, after completion of the said hydrolysis, steam distilling the resultant product to effect the separation of the allyl isothiocyanate from the proteinaceous seed cake residue and recovering the resulting sinigrin-free meal seed cake solid residue, remaining after steam distillation.

7. The process of claim 6 wherein a small quantity of raw seed selected from the group consisting of mustard seed and rape seed is incorporated in the mixture of oil-free meal and water to insure the presence of myrosin in said mixture during the hydrolysis step.

8. The process of claim 7 wherein the amount of raw seed added is about 0.1% of weight based on the weight of the oil-free meal.

9. The process of claim 6 wherein the residue remaining after steam distillation is screened, pressed and dried, and the liquid removed by said screening is mixed with sufficient water that the resulting diluted screen liquid-water mixture is brought to a temperature between 45° and 55° C.; and recycling said diluted mixture to treat another batch of oil-free meal, remaining after extraction of the vegetable oil from the said seeds.

10. The process of treating mustard seed to obtain allyl isothiocyanate and a nutritious protein concentrate characterized by the absence of unpalatable taste and odor, which comprises the steps of controlling the temperature of mustard seed before and during vegetable oil extraction to minimize destruction of the natural occurring myrosin, adding water at a temperature not exceeding 55° C. to the oil extracted meal in a ratio of between 8 and 6 to 1, maintaining the meal and water mixture at about 50° C. for a time sufficient to complete the destruction of sinigrin and the liberation of allyl isothiocyanate, distilling off the allyl isothiocyanate and drying the residue protein meal.

11. The process of treating mustard seed to obtain not only vegetable oil, but also a nutritious protein concentrate characterized by the absence of unpalatable taste and odor and allyl isothiocyanate, which comprises the steps of extracting vegetable oil from the mustard seed while maintaining the mustard seed immediately before and during the extraction at a temperature sufficiently low to minimize the destruction of myrosin naturally occurring in the mustard seed, adding water at a temperature not exceeding about 55° C. to the oil extracted meal in a ratio of between about 8 and 6 to 1, maintaining the meal and water mixture at about 50° C. for a time sufficient to complete the destruction of sinigrin and the liberation of allyl isothiocyanate, distilling off the allyl isothiocyanate and screening the residue to obtain a liquid and protein meal, drying the protein meal, and then recycling the screen liquid to a fresh batch of oil extracted meal.

12. The process of obtaining a nutritious protein concentrate from mustard seed characterized by the absence of unpalatable taste and odor and of also obtaining allyl isothiocyanate, which comprises the steps of controlling the temperature of mustard seed before and during vegetable oil extraction to minimize the destruction of the naturally occurring myrosin, adding water at a temperature not exceeding 55° C. to the oil extracted meal at a ratio of between 8 and 6 to 1, maintaining the meal in water mixture between about 40° C. and about 55° C. for a time sufficient to complete the destruction of sinigrin and liberation of allyl isothiocyanate, distilling off the allyl isothiocyanate and screening the residue to obtain a liquid and protein meal, drying the protein meal, and then recycling the screen liquid to a fresh batch of oil extracted meal, repeating the controlled temperature and distilling steps and recycling of the screen liquor several times, removing the screen liquid and adding yeast thereto, aerating and fermenting such mixture for several hours, removing the liquid from such mixture and adding the residue to the protein meal.

References Cited in the file of this patent

FOREIGN PATENTS

| | | |
|---|---|---|
| 1,670 | Great Britain | 1894 |
| 224,524 | Great Britain | Aug. 27, 1925 |
| 690,597 | Great Britain | Aug. 22, 1953 |